(12) United States Patent
Gu et al.

(10) Patent No.: US 7,805,083 B2
(45) Date of Patent: Sep. 28, 2010

(54) METHOD AND APPARATUS FOR DATA RECOVERY IN AN OPTICAL TRANSMISSION SYSTEM

(75) Inventors: Zheng Gu, Paderborn (DE); Lothar Benedict Erhard Josef Moeller, Middletown, NJ (US); Andreas Thiede, Paderborn (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1226 days.

(21) Appl. No.: 10/942,342

(22) Filed: Sep. 16, 2004

(65) Prior Publication Data

US 2005/0041979 A1  Feb. 24, 2005

Related U.S. Application Data

(63) Continuation-in-part of application No. 10/424,964, filed on Apr. 28, 2003, now Pat. No. 7,254,343.

(51) Int. Cl.
*H04B 10/00* (2006.01)
(52) U.S. Cl. .................. 398/164; 398/155; 398/212
(58) Field of Classification Search ............... 398/155, 398/164, 202–214
See application file for complete search history.

(56) References Cited

U.S. PATENT DOCUMENTS

| 5,357,249 | A | * | 10/1994 | Azaren et al. ............... 341/100 |
| 5,535,187 | A | * | 7/1996 | Melas et al. ................ 369/59.2 |
| 5,850,305 | A | * | 12/1998 | Pidgeon ...................... 398/193 |
| 6,430,715 | B1 | * | 8/2002 | Myers et al. ................ 714/704 |
| 6,686,777 | B1 | * | 2/2004 | Karlquist ...................... 327/2 |
| 7,433,397 | B2 | * | 10/2008 | Garlepp et al. .............. 375/229 |
| 2003/0174737 | A1 | * | 9/2003 | Tanabe ....................... 370/536 |

OTHER PUBLICATIONS

Bulow, et al., "PMD Mitigation at 10 Gbit/s Using Linear and Nonlinear Integrated Electronic Equaliser Circuits," Electronics Letters, Jan. 20, 2000, vol. 36, No. 2, pp. 163-164.

Moller et al., "ISI Mitigation Using Decision Feedback Loop Demonstrated with PMD Distorted 10Gbit/s Signals," Electronics Letters, Nov. 25, 1999, vol. 35, No. 24, pp. 2092-2093.

Winters et al., "Electrical Signal Processing Techniques in Long-Haul Fiber-Optic Systems," IEEE Transactions on Communications, vol. 38, No. 9, Sep. 1990, pp. 1439-1453.

(Continued)

*Primary Examiner*—Dzung D Tran
(74) *Attorney, Agent, or Firm*—Wall & Tong LLP

(57) ABSTRACT

Method and apparatus for data recovery in optical transmission systems include parallel detection subcircuits for determining output values of sequentially provided optical data bits such that sequentially provided optical data bits are alternately processed by respective ones of the parallel detection subcircuits. For example, in one embodiment of the present invention, clock values to be used for timing provided to the first parallel detection subcircuit are 180° out of phase with clock values provided to the second parallel detection subcircuit, such that the first parallel detection subcircuit and the second parallel detection subcircuit alternately process input optical data bits according to odd valued clock signals and even valued clock signals. Furthermore, the outputs of the parallel detection subcircuits are connected crosswise to provide control signals for their parallel counterparts. In principle, various decisions are made using decision circuits and desired output values are selected based on the previously decided bits.

16 Claims, 5 Drawing Sheets

OTHER PUBLICATIONS

Winters et al., "Adaptive Nonlinear Cancellation for High-Speed Fiber-Optic Systems," Journal of Lightwave Technology, vol. 10, No. 7, Jul. 1992, pp. 971-977.

Wang, et al., "An Improved Decision Feedback Loop for Optical Communications," Joint Symposium on Opto- & Microelectronic Devices and Circuits, Wuhan, China, Mar. 24, 2004.

* cited by examiner

METHOD AND APPARATUS FOR DATA RECOVERY IN AN OPTICAL TRANSMISSION SYSTEM

CROSS-REFERENCE TO RELATED APPLICATIONS

This application is a Continuation-in-Part of and claims priority to U.S. patent application Ser. No. 10/424,964, filed Apr. 28, 2003, now U.S. Pat. No. 7,254,343, which is incorporated herein by reference in its entirety.

FIELD OF INVENTION

This invention relates to the field of optical transmission systems and, more specifically, to improving the data recovery in such optical transmission systems via electrical decision feedback.

BACKGROUND OF INVENTION

The maximum reach of long haul on-off keying transmission systems (such as a wavelength division multiplexed (WDM) transmission system operating at 20 Gbits/s or above) is typically limited by three types of signal distortion. Examples of such distortions are optical signal-to-noise ratio (OSNR) degradation, cross-talk and intersymbol interference (ISI). For the purposes of this discussion, ISI-related distortion are of further interest. ISI occurs when received data pulses are altered by pulse broadening or multi-path propagation (e.g., reflections) in the channel in which they travel. Pulse broadening can occur because of chromatic or polarization mode dispersions or receiver bandwidth limitations as described below. The results of such interference result in poor transmission characteristics.

One specific transmission characteristic that can drastically limit transmission in high-bit-rate systems, particularly for standard single-mode fibers (SSMF), is pulse-spreading type of ISI. This condition is shown in FIGS. 1a and 1b. Specifically, FIG. 1a depicts a graph 100 of the signal intensity I over time T for an input fiber of a WDM transmission system. The graph 100 is broken up into bit slots (denoted by sections 102, 104 and 106, respectively) which define the time slots available for data to be transmitted in such a system. At a first bit slot, bit slot 102, a "1" data bit (encoded in a non-return to zero (NRZ) format) is being transmitted followed by a "0" data bit in a second bit slot, bit slot 104. In a perfect WDM transmission system with perfectly formed fibers, the output intensity of these data pulses would be identical to the input data pulses shown in graph 100. Unfortunately, due to the above-identified interference conditions (pulse-spreading and the like), the signal sent to the output fiber is not identical to the signal sent to the input fiber.

More specifically, a graph of the signal intensity at the output fiber is seen in graph 120 of FIG. 1b. The graph 120 shows the same bit slots 102, 104 and 106 after the "1" and "0" data bits have passed through the transmission system. The resultant data stream is more rounded and not as well defined in the first bit slot 102 for the "1" data bit and furthermore extending into the second bit slot 104 which must represent the "0" data bit. ISI occurs when pulses propagating in the fiber spread out and overlap with each other. This condition can occur due to any of the above-described dispersion (or other) phenomena or by the bandwidth of a particular receiver being smaller than the system data rate (i.e., a 10 Gbits/s signal received by a 8 Gbit/s bandwidth limited receiver). The overlap, along with fiber nonlinearity, creates the ISI at locations of the "0" bits in a sequence of pulses, representing logical "1's" and "0's". If the ISI becomes too large, it is detected by a receiver as logical "1's", which can lead to transmission errors. These deleterious transmission characteristics are evidenced at the 10 Gbit/s transmission rate. As the bit rates of such a WDM transmission system increases, (i.e., for 20 Gbit/s, 40 Gbit/s and higher), the pulse broadening and subsequent ISI severely restricts the usable bandwidth of the system.

Methods of mitigating ISI and the effects it has on circuitry is found in various references including J. H. Winters, R. D. Gitlin, "Electrical Signal Processing Techniques in Longhaul Fiber-optic Systems", IEEE Transactions on Communications, Vol. 38, Issue 9, September 1990, pp. 1439-1453; L. Möller, A. Thiede, S. Chandrasekhar, W. Benz, M. Lang, T. Jakobus, M. Schlechtweg, "ISI Mitigation Using Decision Feedback Loop Demonstrated with PMD Distorted 10 Gbit/s signals", Electronics Letters, Nov. 25, 1999, Vol. 35, No. 24, pp. 2092-2093; H. Bülow, F. Buchali, W. Baumert, R. Ballentin, T. Wehren, "PMD Mitigation at 10 Gbit/s Using Linear and Nonlinear Integrated Electronic Equaliser Circuits", Electronics Letters, Jan. 20, 2000, Vol. 36, No. 2, pp. 163-164; and J. H. Winters, S. Kasturia, "Adaptive Nonlinear Cancellation for High-speed Fiber-optic Systems", IEEE Journal of Lightwave Technology, Vol. 10, No. 7, July 1992, pp. 971-977. However, as bit rates increase, such solutions will not be able to adequately compensate for the inevitable signal distortions.

As such, there remains a need for optical fiber transmission systems that can handle high-capacity communications while reducing the deleterious consequences of linear and/or non-linear distortions and PMD.

SUMMARY OF THE INVENTION

The present invention advantageously provides a method and apparatus for data recovery in an optical transmission system, where the method and apparatus provide a reduction of intra-channel distortions of received data resulting from linear and/or non-linear signal propagation. In one embodiment of the invention, an apparatus includes a plurality of parallel detection subcircuits for determining output values of a plurality of sequentially provided input optical data bits such that said sequentially provided input optical data bits are alternately processed by respective ones of said plurality of parallel detection subcircuits. For example, in one an embodiment of the present invention, clock values provided to the first parallel detection subcircuit to be used for timing are 180° out of phase with clock values provided to the second parallel detection subcircuit, such that the first parallel detection subcircuit and the second parallel detection subcircuit alternately process the input optical data bits according to odd valued clock signals and even valued clock signals, respectively.

In an alternate embodiment of the present invention, a method for data recovery includes comparing, in each of a plurality of parallel detection subcircuits, a received electrical representation of an optical data bit to a high voltage threshold and a low voltage threshold to determine an output value for the received electrical representation of an optical data bit, where sequentially provided electrical representations of optical data bits are alternately processed by the plurality of parallel detection subcircuits.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1A:
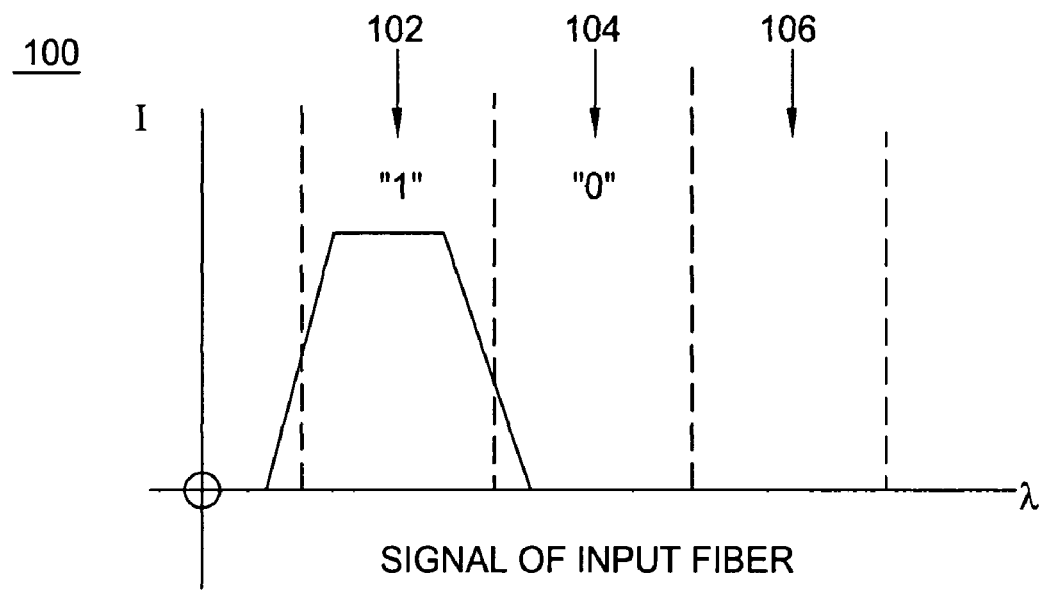
FIG. 1a depicts a graph of input power versus time for a data signal of the prior art.
Figure 1B:
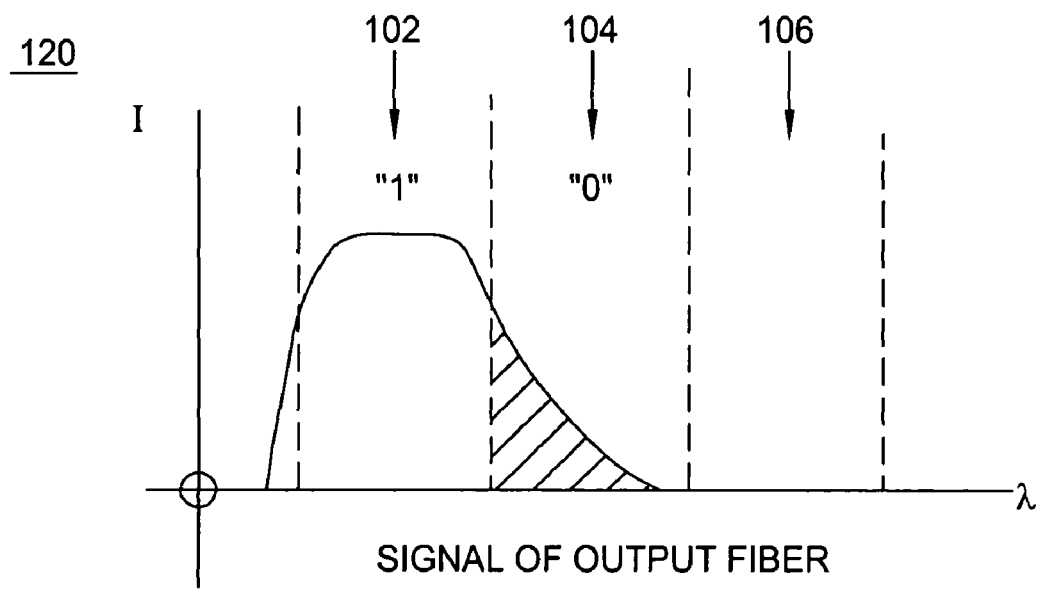
FIG. 1b depicts a graph of output power versus time for a data signal of the prior art.
Figure 2A:
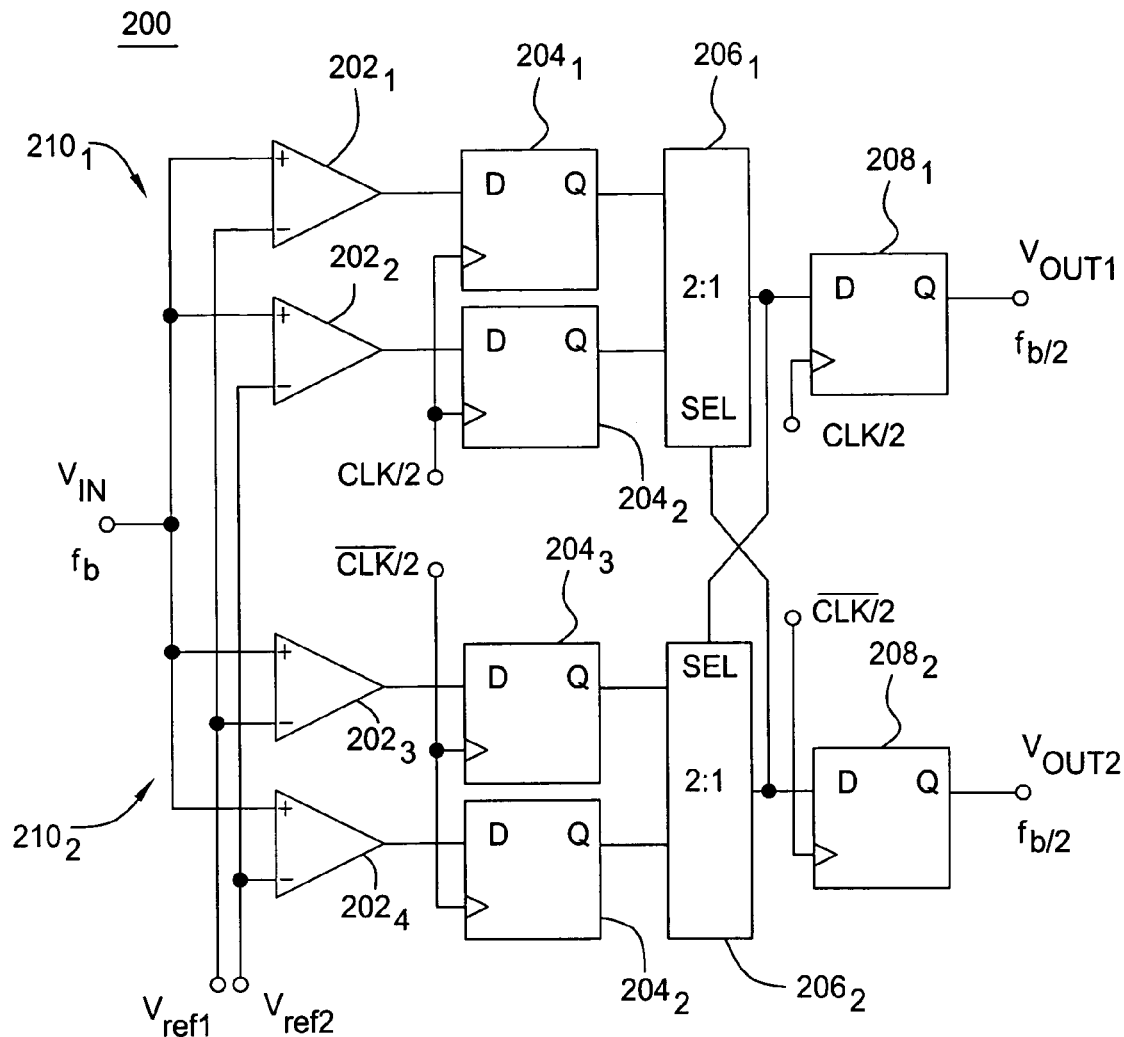
FIG. 2a depicts a circuit diagram of an apparatus for improved data recovery in accordance with the subject invention.

FIG. 2a depicts a circuit diagram of a decision feedback equalizer (DFE) 200 in accordance with the subject invention. The DFE 200 of the subject invention is capable of accepting electrical input data signals $V_{in}$ based upon optical data signals, appropriately converted, and analyzing such data at a variety of circuit elements to output an appropriately recovered data signal component $V_{out1}$ or $V_{out2}$. More specifically, the DFE 200 compares the incoming data $V_{in}$ to reference voltages denoting threshold detection points for data analysis. Dependent upon clock signaling and the prior data bit value, the DFE 200 will output the data signal component at either a first data output line $V_{out1}$ or a second data output line $V_{out2}$. The configuration of the DFE 200 is such that it facilitates processing of a data pulse stream (i.e., the incoming data signal $V_{in}$) of 10 Gbits/s and higher (e.g., 20 Gbits/s, 40 Gbits/s and the like) by splitting the incoming signal $V_{in}$ into odd and even clock valued bits. As such, corresponding odd and even clock value actuated detection subcircuits are operating at only half of the transmission system data rate. The reader should note that FIG. 2a represents a simplified drawing of the circuit of the subject invention. Specifically, each line that connects circuit elements actually represents two lines, each of which carry complementary values of the signal traveling along the depicted line. Additional details are provided in the following description where necessary.

The DFE 200 comprises a plurality of parallel detection subcircuits $210_n$ for processing incoming data pulses $V_{in}$. In one embodiment of the subject invention, a first parallel subcircuit $210_1$ and a second parallel subcircuit $210_2$ are provided. Each subcircuit $210_n$ further comprises a plurality of input analyzers $202_n$. The signal analyzers $202_n$ compare the incoming data $V_{in}$ to threshold references ($V_{ref+}$ and $V_{ref-}$) in order to accurately recover data from $V_{in}$. As discussed above, each line in the depicted circuit represents two lines of complementary input. Accordingly, each signal analyzer $202_n$ has four actual inputs that are represented by the two depicted inputs. For example, the line carrying $V_{in}$ to first signal analyzer $202_1$ is actually one line connecting $V_{in}$ to a non-inverting input ($V_{in+}$) and a second line connecting $V_{in}$ to an inverting input on the first signal analyzer $202_1$ ($V_{in-}$). The line carrying $V_1$ on the first signal analyzer $202_1$ is actually one line connecting $V_{ref+}$ to a non-inverting input on the first signal analyzer $202_1$ and a second line connecting $V_{ref-}$ to an inverting input on the first signal analyzer $202_1$ for a total of four inputs. Accordingly the line carrying $V_{ref2}$ on the second signal analyzer $202_2$ is actually online connecting $V_{ref-}$ to a non-inverting input on the signal analyzer $202_2$ and a second line connecting $V_{ref+}$ to an inverting input on the second signal analyzer $202_2$ for again a total of four inputs. Similar connections are made to the third and fourth signal analyzers $202_3$ and $202_4$, respectively. The results of the signal analyzers $202_n$ are passed on to a plurality of memory devices $204_n$.

In the first subcircuit $210_1$, the first signal analyzer $202_1$ receives data $V_{in}$ and compares it to an upper detection threshold ($V_{ref+}$) and sends the results to first memory unit $204_1$. A second signal analyzer $202_2$ receives input from $V_{in}$ and compares it to a lower detection threshold reference ($V_{ref-}$). The result of the second signal analyzer $202_2$ is passed on to second memory device $204_2$. More specifically, each signal analyzer $202_n$ has two outputs (represented by the single output line shown). Each memory device $204_n$ has a non-inverting input D+ to accept one of the signal analyzer outputs and an inverting input D- to accept another of the signal analyzer outputs. Each of the plurality of memory devices $204_n$ is also provided with input that is correlated to the timing of the transmission system. In one embodiment, the memory devices $204_n$ are provided with input timing pulses at timing intervals that correspond to half of the system clock rate (CLK/2).

The single CLK/2 line represents two clock inputs (CLK/2)+ and (CLK/2)- applied to each memory device $204_n$. The specific and strategic reason for designing the circuit with a complementary line configuration is that at the high operational speed of the circuit, it is easier to decide about the difference between two voltages (applied signals) than to decide about their absolute value. In other words, common mode distortions are more easily suppressed with the described configuration. The output of each of the plurality of memory units $204_n$ is provided to a selector unit $206_n$. Specifically, and in one embodiment, the output from first memory device $204_i$ and the output of second memory device $204_2$ is provided to first selector $206_1$.

The second subcircuit $210_2$ is similarly configured and wired as the first subcircuit $210_1$. Specifically, a third signal analyzer $202_3$ receives inputs from $V_{in}$ and upper threshold reference $V_{ref1}$ and outputs the results to third memory device $204_3$. Similarly, fourth signal analyzer $202_4$ is provided with input from $V_{in}$ and the lower detection threshold $V_{ref2}$. The output of fourth signal analyzer $202_4$ is provided as input to a fourth memory device $204_4$. Each of the third and fourth memory devices $204_3$ and $204_4$ are also provided with timing pulses that are correlated to the transmission system timing. Specifically, and in one embodiment, second subcircuit $210_2$ is provided with input timing pulses at timing intervals that are half of the system clock. However, these timing pulses are opposite or 180° out of phase with pulses provided to the first subcircuit $210_1$ (i.e., $\overline{CLK}/2$). Outputs from the third and fourth memory units $204_3$ and $204_4$ are provided to a second selector $206_2$.

The selector 206 from each subcircuit $210_n$ is crosswired to its counterpart in the other subcircuit. In this manner, each subcircuit $210_n$ is connected to its parallel counterpart so that each subcircuit controls the selection for the next bit in the other subcircuit $210_n$. The output from each selector $206_1$ and $206_2$ is provided as input to first and second secondary memory units $208_1$ and $208_2$, respectively. First secondary memory unit $208_1$ is provided with an input clock signal one half the clock rate of the transmission system (CLK/2). Second secondary memory unit $208_2$ is provided with an input clock signal one half the clock rate of the transmission system but at 180° out of phase with the first subcircuit $210_1$ ($\overline{CLK}/2$). Accordingly, if the input data pulse at $V_{in}$ is an odd clock valued data pulse, its recovered output can be found at $V_{out1}$. If incoming data $V_{in}$ is an even clock valued data pulse, the output can be found out at $V_{out2}$. Effectively, each subcircuit $210_n$ divides the data recovery tasks so that each subcircuit $210_n$ is only working at one half the system clock rate (CLK typically 10, 20 Gbits/s or higher).

The DFE 200 of FIG. 2a, is created using a plurality of switching and logic components. In one embodiment, the DFE 200 is realized using an enhancement-depletion AlGaAs/GaAs HEMT technology with a 0.2 µm gate length and a threshold frequency of about 60 GHz. Optionally, the DFE 200 is built in source-coupled FET logic for better common-mode noise rejection and high speed circuit operation. Differential coplanar waveguides are implemented on a single chip for providing both clock pulses and data pulses to the circuit 200. In one particular example, the entire DFE circuit 200 comprises approximately 310 FETs on a chip area of approximately 2.5 mm² and operates at a power consumption level of approximately 1.9 W. Accordingly, the subject invention has the capabilities of providing differential feedback equalization to a 20 Gbits/s signal. This design takes advantage of parallel signal processing which reduces electrical bandwidth requirements of the circuit while increasing the gain of a received signal with greater accuracy then previously realizable. One skilled in the art can also understand that since the typical delays associated with a basic feedback loop configuration have been eliminated, incoming signal rates of up to 20 Gbits/s and higher can be processed with the same or better results than the processing of slower signals in the conventional manner.

Figure 2B:
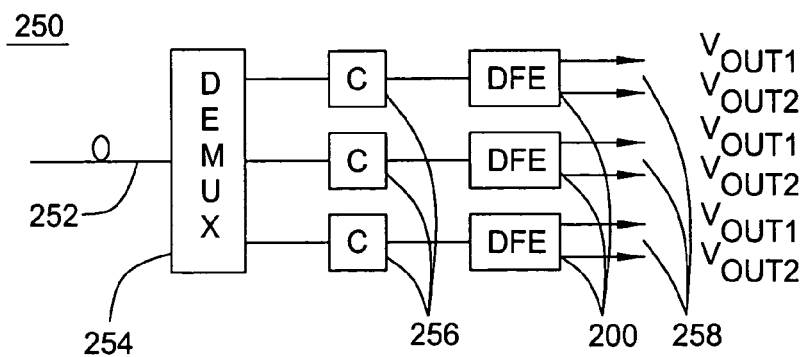
FIG. 2b depicts a block diagram of an optical receiver comprising the apparatus of the subject invention.

Another embodiment of the invention is seen in FIG. 2b depicting an optical receiver 250 incorporating the DFE 200. Specifically, optical receiver 250 receives a train of broad spectrum (WDM) optical data pulses from transmission line 252. The pulses are provided to an optical demultiplexer 254 which segregates the broad spectrum pulses into individual wavelength pulses. The optical receiver may or may not incorporate a single broad spectrum or individual wavelength amplifiers (not shown, but understood by those skilled in the art) to improve incoming pulse quality prior to further processing. Subsequent to demultiplexing, the individual wavelength pulses are provided to a plurality of converters 256 which convert the optical signal into an electrical signal (a logical "1" or "0"). These electrical signals are then provided to a plurality of DFE's 200 for analysis and data recovery as described to provide a plurality of data recovered electrical signals 258.

There are several types of optical data receivers, which can benefit from the above-identified DFE. More specifically, two basic types of optical data receivers are a PIN receiver and an optically pre-amplified receiver. Typically, PIN receivers include, among other components, a photodiode for receiving optical data signals from a transmission line followed by an electrical amplifier. Such a receiver configuration introduces a certain amount of terminal noise into the received signal prior to threshold detection (or recovery); hence, such a receiver requires a relatively higher degree of received power than an optically pre-amplified receiver. The optically pre-amplified receiver contains, among other components, an optical amplifier which receives optical data signals from a transmission line and amplifies them. Subsequent to optical pre-amplification, the received data signal is passed through a band-pass filter (BPF) so as to filter undesirable optical components and sharpen the received signal. Subsequent to band-pass filtering, the received signal is passed to a photodiode which converts the optical signal into an electrical signal.

Figure 4:
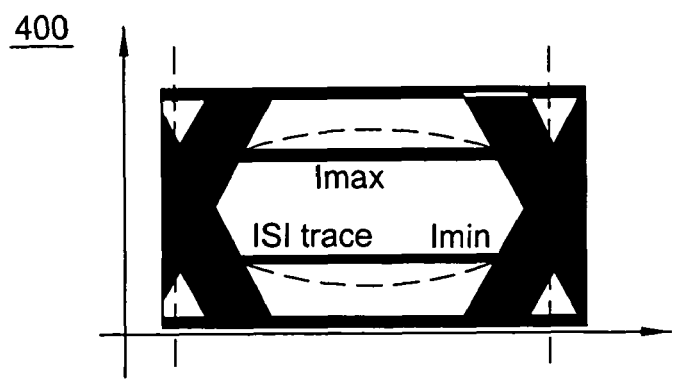
FIG. 4 depicts an eye diagram of an ISI distorted signal that is improved by the subject invention.

The performance gain of a PIN and optically pre-amplified receivers with implemented DFE is described as follows. For PIN receivers, symbol independent thermal noise is the main noise source. For optically pre-amplified receivers, the signal-ASE beat noise becomes dominant. Consequently there will be different performance gains for DFE operation in both receiver types. The amount of InterSymbol Interference (ISI) in both receivers in the examples was the same. For the purpose of equalization gain estimation, FIG. 4 shows an eye diagram 400 of an ISI distorted NRZ signal. For a PIN receiver, the Q factor of the unequalized signal is given by $$Q \approx \left(\frac{I_{max} - I_{min}}{2\sigma_{th}}\right)$$

where $I_{max}$, $I_{min}$ and $\sigma_{th}$ stand for the inner eye borders (traces) and the variance of the thermal noise respectively. Perfect cancellation of the trace representing $I_{min}$ by means of the DFE would improve the receiver sensitivity by a penalty reduction of $$\Delta = -20\log\left[\frac{Q_{DFE}}{Q_{ISI}}\right] = -20\log\left[\frac{I_{max} - I_{min}}{I_{max}}\right]$$

In the case of an optically pre-amplified receiver, the noise variance becomes symbol dependent. Good approximations for Q factors with and without DEE operation are then given by $$Q \approx \frac{I_{max} - I_{min}}{X_{ASE}\sqrt{I_{max}} + X_{ASE}\sqrt{I_{min}}}$$

$$Q_{DFE} \approx \frac{I'_{max}}{X_{ASE}\sqrt{I'_{max}} + X_{ASE}\sqrt{I'_{min}}}$$

$$\Delta = 10\log\left[\frac{I_{max}}{I'_{max}}\right]\bigg|_{Q_{DFE}=Q}$$

where $X_{ASE}$ is a parameter that describes the signal ASE beat noise. When assuming that $I_{max}$ and $I_{min}$ are proportional to each other, the penalty reduction in the case of the optically pre-amplified receiver is expected to be twice than that for the PIN receiver. Also the ISI amount can be estimated after the penalty is measured.

Figure 3A:
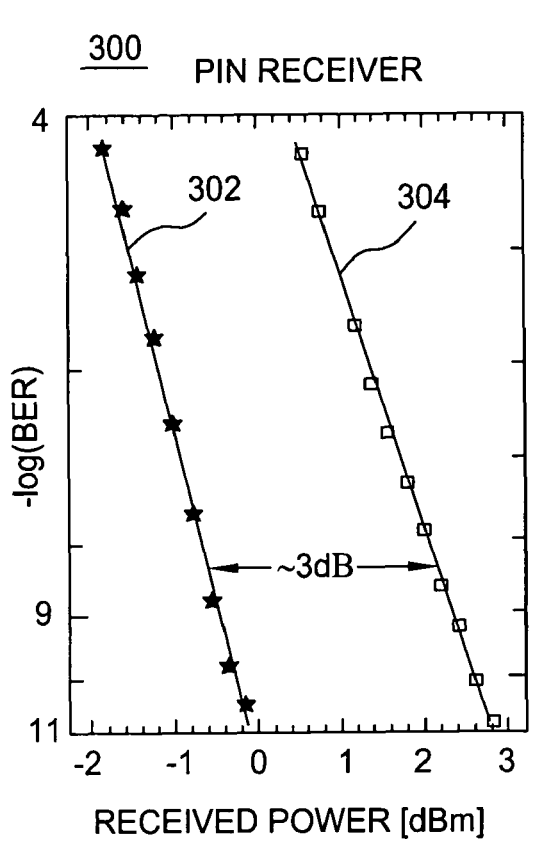
FIG. 3a is a graph of the bit error rate versus received power for a first type of receiver in an optical transmission system that is recovering data in accordance with the subject invention.
Figure 3B:
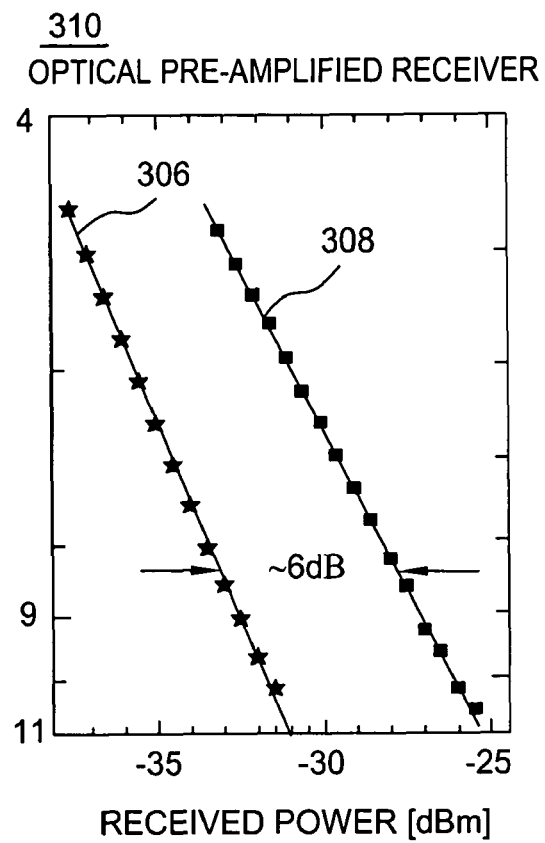
FIG. 3b is a graph of bit error rate versus received power for a second type of receiver in an optical transmission system that is recovering data in accordance with the subject invention.

In one example, a 20 Gb/s signal was generated by polarization multiplexing of two orthogonally polarized and decorrelated 10 Gb/s 33% RZ data streams. By time interleaving of the $2^{31}$-1 PRBS data streams with 50 ps phase offset the ISI was minimized. A lightwave converter with relative small electrical bandwidth was used to detect the 20 Gb/s signal. After launching the signal to the decision circuit that included a 2:1 electrical de-mux, the bit error rate measurement was performed at 10 Gb/s data rate. FIG. 3 depicts graphs denoting the characteristics of each type of receiver described above. Specifically, FIG. 3a shows a graph 300 plotting received power of a PIN receiver versus the bit error rate (in logarithmic scale). FIG. 3b depicts a graph 310 plotting received power of an optically pre-amplified receiver versus the bit error rate (in logarithmic scale). First line 302 (corresponding to the star data points) denote the received power versus bit error rate with a DFE equipped PIN receiver, while a line at 304 (corresponding to the square data points) reflects the same characteristics without DFE. Inspection readily reveals that it is possible to lower the power of a transmitted data signal to the PIN receiver simply by virtue of DFE recovery techniques as described in the subject invention. Similarly, FIG. 3b shows similar lines for a pre-amplified receiver. That is, line 306 (corresponding to the star data points) reveals a lower power of a transmitted signal to the optically pre-amplified receiver with DFE than that of a line at 308 (corresponding to the square data points) of such receiver not using DFE. Specifically, the gain from feedback equalization from the subject invention was about 3 dB for the PIN receiver and about twice that for the optically pre-amplified receiver. This is in good agreement with the derivations. The experimental result estimates the ISI to be about 50% (0.5 $I_{max} \approx I_{min}$) in front of the decision element without feedback operation. From this we conclude the overall electrical bandwidth of the front end to be around 10 GHz. Accordingly, the results shown herein indicate that there is an improvement in systems using the DFE of the subject invention in that the received power of a transmitted data signal can be reduced and yet still maintain accurate data recovery.

Figure 5:
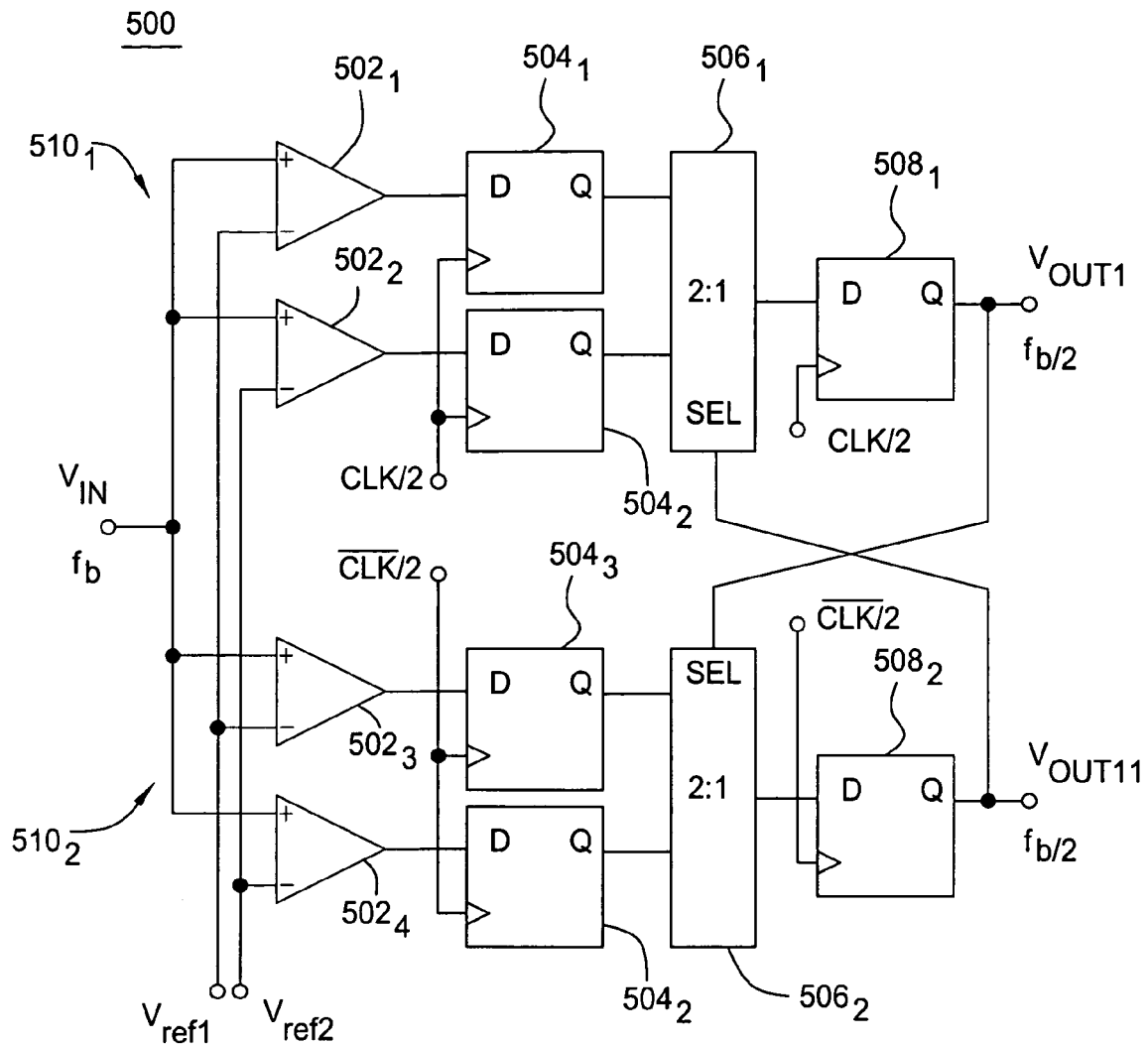
FIG. 5 depicts a circuit diagram of an alternate embodiment of an apparatus for improved data recovery in accordance with the subject invention.

FIG. 5 depicts a circuit diagram of an alternate embodiment of a decision feedback equalizer (DFE) 500 in accordance with the subject invention. The DFE 500 of FIG. 5 comprises the same components and provides substantially the same function as the DFE 200 of FIG. 2 however, in the DFE 500 of FIG. 5, the first and second secondary memory devices are included within the feedback loop. More specifically, the DFE 500 of FIG. 5 comprises a plurality of parallel detection subcircuits (illustratively two parallel detection subcircuits) $510_1$-$510_2$ for processing incoming data pulses $V_{in}$. Each subcircuit $510_n$ further comprises a plurality of input analyzers $502_n$. The signal analyzers $502_n$ compare the incoming data $V_{in}$ to threshold references ($V_{ref1}$ and $V_{ref2}$) in order to accurately recover data from $V_{in}$. As discussed above, each line in the depicted circuit represents two lines of complementary input. Accordingly, each signal analyzer $502_n$ has four actual inputs that are represented by the two depicted inputs. The results of the signal analyzers $502_n$ are communicated to a plurality of memory devices $504_n$ (at least one respective memory device for each signal analyzer), illustratively depicted as flip-flops.

As in the DEF 200 of FIG. 2, in the first subcircuit $510_1$ of the DEF 500 of FIG. 5, the first signal analyzer $502_1$ receives data $V_{in}$, compares it to an upper detection threshold ($V_{ref1}$) and communicates the results to the first memory device $504_1$. The second signal analyzer $502_2$ receives input from $V_{in}$ and compares it to a lower detection threshold reference ($V_{ref2}$). The result of the second signal analyzer $502_2$ is communicated to the second memory device $504_2$. As described above, each memory device $504_n$ has a non-inverting input to accept one of the signal analyzer outputs and an inverting input to accept another of the signal analyzer outputs. Each of the plurality of memory devices $504_n$ is also provided with an input that is correlated to the timing of the transmission system. For example, in the DFE 500 the memory devices $504_n$ are provided with input timing pulses at timing intervals that are half of the system clock rate (CLK/2).

Again, the single CLK/2 line represents two clock inputs (CLK/2)+ and (CLK/2)- applied to each memory device $504_n$. The output of each of the memory devices $504_n$ of the first subcircuit $510_1$ is provided to a first selector $506_1$.

The second subcircuit $510_2$ is similarly configured and arranged as the first subcircuit $510_1$. Specifically, a third signal analyzer $502_3$ receives inputs from $V_{in}$ and upper threshold reference $V_{ref1}$ and communicates the results to a third memory device $504_3$. Similarly, a fourth signal analyzer $502_4$ is provided with input from $V_{in}$ and the lower detection threshold ($V_{ref2}$). The output of the fourth signal analyzer $502_4$ is communicated to a fourth memory device $504_4$. Each of the third and fourth memory devices $504_3$ and $504_4$ are also provided with timing pulses that are correlated to the transmission system timing. Specifically, in the embodiment of FIG. 5, the second subcircuit $510_2$ is provided with input timing pulses at timing intervals that are half of the system clock. However, these timing pulses are 180° out of phase with pulses provided to the first subcircuit $510_1$. The outputs of the third and fourth memory devices $504_3$ and $504_4$ are provided to a second selector $506_2$.

The output from each selector $506_1$ and $506_2$ is provided as an input to respective first and second secondary memory devices $508_1$ and $508_2$. The first secondary memory device $508_1$ is provided with an input clock signal one half the clock rate of the transmission system (CLK/2). The second secondary memory device $508_2$ is provided with an input clock signal one half the clock rate of the transmission system but at 180° out of phase with the first subcircuit $510_1$. Accordingly, if the input data pulse at $V_{in}$ is an odd clock valued data pulse, its recovered output can be found at $V_{out1}$. If incoming data $V_{in}$ is an even clock valued data pulse, the output can be found out at $V_{out2}$. Effectively, each subcircuit $510_n$ divides the data recovery tasks so that each subcircuit $510_1$-$510_2$ is only working at one half the system clock rate.

However, in the DFE 500 of FIG. 5, unlike in the DFE 200 of FIG. 2, instead of cross-feeding the output of each of the selectors $506_n$ to its parallel counterpart (i.e., feeding back as a control signal the output of the first selector $506_1$ in the first subcircuit $510_1$ to the second selector $506_1$ in the second subcircuit $510_2$), a feedback signal is coupled to each of the selectors $506_n$ from the output of the secondary memory device $508_n$ in the parallel counterpart circuit. More specifically and as depicted in the DFE 500 of FIG. 5, at least a portion of the output of the first secondary memory device $508_1$ in the first subcircuit $510_1$ is fed back as a control signal to the second selector $506_2$ in the second subcircuit $510_2$. Similarly, at least a portion of the output of the second secondary memory device $508_2$ in the second subcircuit $510_2$ is fed back as a control signal to the first selector $506_1$ in the first subcircuit $510_1$. In this configuration, the control signal and the input data to the selectors $506_1$ are synchronized. As such, the control signals from the respective subcircuits have no influence on each other and unwanted pulse spikes in the output of the selectors $506_n$, due to timing differences between the input data and the control data to the selectors $506_n$, are avoided.

Figure 6:
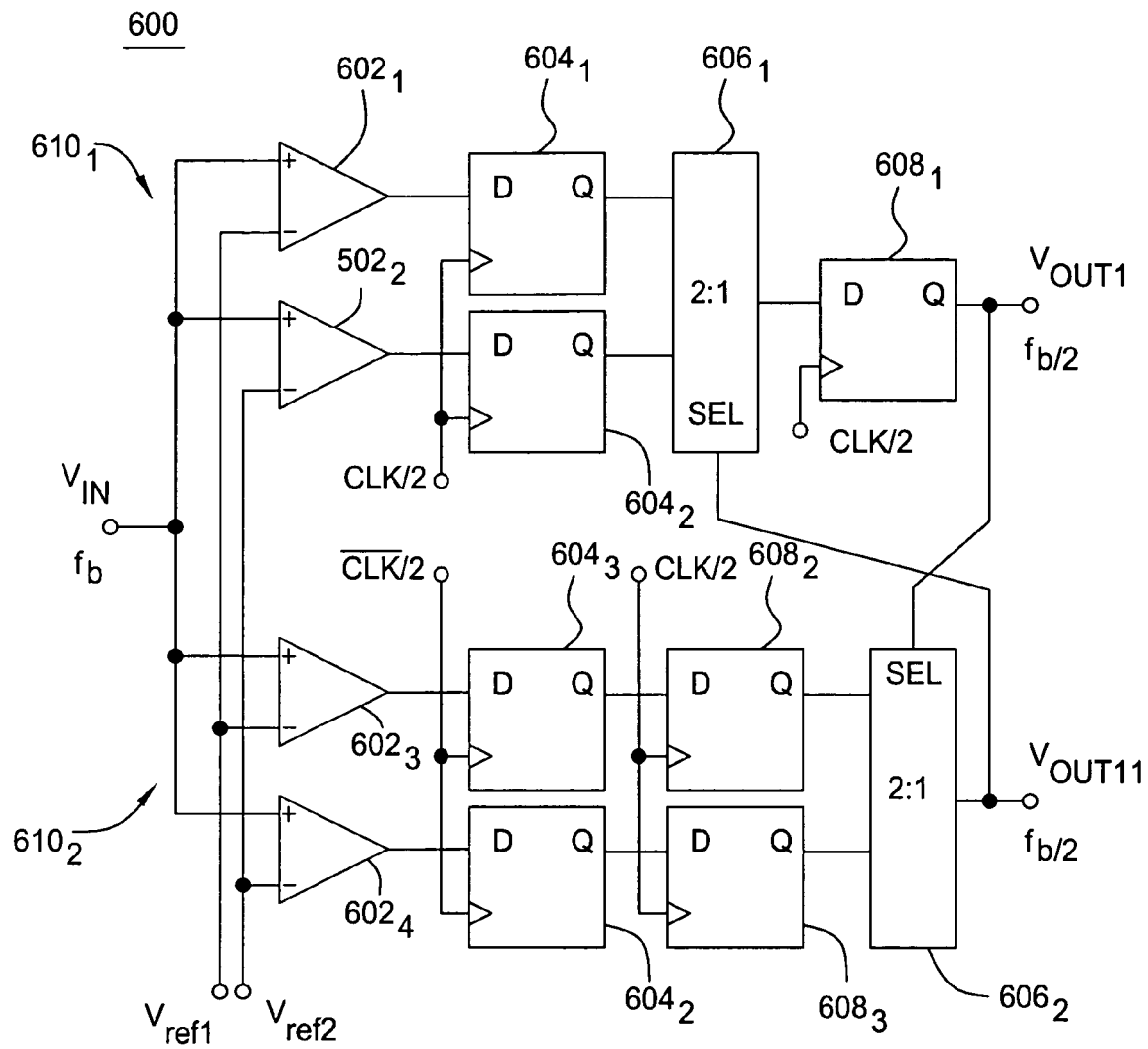
FIG. 6 depicts a circuit diagram of another alternate embodiment of an apparatus for improved data recovery in accordance with the subject invention.

FIG. 6 depicts a circuit diagram of an alternate embodiment of a decision feedback equalizer (DFE) 600 in accordance with the subject invention. The DFE 600 of FIG. 6 comprises substantially the same components as the DFE 200 of FIG. 2 and the DFE 500 of FIG. 5 and provides the synchronization of the control signals and the input data to the selectors $506_n$ as in the DFE 500 of FIG. 5 however, in the DFE 600 of FIG. 6, the input data in at least one of the subcircuits is sampled twice before being communicated to the selectors. More specifically, the DFE 600 of FIG. 6 comprises a plurality of parallel detection subcircuits (illustratively two parallel detection subcircuits) $610_1$-$610_2$ for processing incoming data pulses $V_{in}$. Each subcircuit $610_n$ further comprises a plurality of input analyzers $602_n$. The signal analyzers $602_n$ compare the incoming data $V_{in}$ to threshold references ($V_{ref1}$ and $V_{ref2}$) in order to accurately recover data from $V_{in}$. As discussed above, each line in the depicted circuit represents two lines of complementary input. Accordingly, each signal analyzer $602_n$ has four actual inputs that are represented by the two depicted inputs. The results of the signal analyzers $602_n$ are communicated to a plurality of memory devices $604_n$ (at least one respective memory device for each signal analyzer), illustratively depicted as flip-flops.

As in the DEF 200 of FIG. 2 and the DEF 500 of FIG. 5, in the first subcircuit $610_1$ of the DEF 600 of FIG. 6, the first signal analyzer $602_1$ receives data $V_{in}$ and compares it to an upper detection threshold ($V_{ref1}$) and communicates the results to the first memory device $604_1$. The second signal analyzer $602_2$ receives the input from $V_{in}$ and compares it to a lower detection threshold reference ($V_{ref2}$). The result of the second signal analyzer $602_2$ is communicated to the second memory device $604_2$. As described above, each memory device $604_n$ has a non-inverting input to accept one of the signal analyzer outputs and an inverting input to accept another of the signal analyzer outputs. Each of the plurality of memory devices $604_n$ is also provided with an input that is correlated to the timing of the transmission system. For example, in the DFE 600 the memory devices $604_n$ are provided with input timing pulses at timing intervals that are half of the system clock rate (CLK/2). In the first subcircuit $610_1$, the outputs of the first memory device $604_1$ and the second memory device $604_2$ are communicated to the first selector unit $606_1$. The output of the first selector unit $606_1$ is communicated to a first secondary memory device $608_1$.

In the second subcircuit $610_2$ of the DFE 600 of FIG. 6, a third signal analyzer $602_3$ receives inputs from $V_{in}$ and the upper threshold reference $V_{ref1}$ and communicates the results to a third memory device $604_3$. Similarly, a fourth signal analyzer $602_4$ is provided with an input from $V_{in}$ and the lower detection threshold ($V_{ref2}$). The output of the fourth signal analyzer $602_4$ is provided as an input to a fourth memory device $604_4$. The third and fourth memory devices $604_3$ and $604_4$ are also provided with timing pulses that are correlated to the transmission system timing. Specifically, in the embodiment of FIG. 6, the second subcircuit $610_2$ is provided with input timing pulses at timing intervals that are half of the system clock. However, these timing pulses are 180° out of phase with pulses provided to the first subcircuit $610_1$.

Unlike in the DFE 200 of FIG. 2 and the DFE 500 of FIG. 5, in the second subcircuit $610_2$ of the DFE 600 of FIG. 6, the output of the third memory device $604_3$ is communicated to a second secondary memory device $608_2$ and the output of the fourth memory device $604_4$ is communicated to a third secondary memory device $608_3$. As evident in the DFE 600 of FIG. 6, with such a configuration, the input data is sampled twice in the second subcircuit $610_2$ before being communicated to a respective selector $606_n$. More specifically, the outputs of the second secondary memory device $608_2$ and the third secondary memory device $608_3$ are communicated to a second selector $606_2$. It should be noted that in the DFE 600 of FIG. 6, the clock signals (clock tones) provided to the second secondary memory device $608_2$ and the third secondary memory device $608_3$ are in phase.

In the DFE 600 of FIG. 6, the output of the first secondary memory device $608_1$ in the first subcircuit $610_1$ is cross-fed as a control signal to the second selector $606_2$ in the second subcircuit $610_2$. In the second subcircuit $610_2$, the output of the second selector $606_2$ is cross-fed as a control signal to its parallel counterpart, the first selector $606_1$ in the first subcircuit $610_1$. With such a configuration, in the first subcircuit $610_1$ the input data of the first selector $606_1$ arrives earlier than the control signal fedback from the second subcircuit $610_2$. As such, some pulse spikes in the output of the first selector $606_1$ may occur, however the sampling of the output of the first selector $606_1$ taken by the first secondary memory device $608_1$ occurs at a time away from any produced pulse spike. One advantage of the configuration of the DFE 600 of FIG. 6 over the configuration of the DFE 500 of FIG. 5 is that in the DFE 500 of FIG. 5 the delay limit for the selectors $506_n$ and the respective secondary memory devices $608_n$ is limited to within half of period of half of the system clock rate (CLK/2), which limits the maximum input data rate of an input signal to the DFE 500. In contrast, the configuration of the DFE 600 of FIG. 6 relaxes the speed limitation of the components in the feedback path, which allows for a higher input data rate for the DFE 600 of FIG. 6.

A DFE in accordance with the present invention is capable of being constructed using SiGe:C Heterobipolar technology described in "Novel collector design for high-speed SiGe:C HBTs", B. Heinemann et al., IEDM, 2002, which herein incorporated by reference in its entirety. More specifically, the SiGe:C Heterobipolar technology is an epi-free and single-poly technology with 0.25 µm minimum lithographic feature size and four metal layers. The technology incorporates low concentration of carbon into the SiGe region of a heterojunction bipolar transistor (HBT), which significantly suppresses boron outdiffusion caused by subsequent processing steps and improves HBT performance. The transit frequency and oscillation frequency of DFE circuits in accordance with the present invention constructed in SiGe:C Heterobipolar technology measure up to 200 GHz at a breakdown voltage of 2.0 volts and display extremely low ring oscillator delay of 4.2 ps.

Although various embodiments that incorporate the teachings of the present invention have been shown and described in detail herein, those skilled in the art can readily devise many other varied embodiments that still incorporate these teachings.

What is claimed is:

1. An apparatus for data recovery of a plurality of sequentially provided electrical representations of optical data bits, comprising:

at least two parallel detection subcircuits for receiving said sequentially provided electrical representations of optical data bits, said parallel detection subcircuits alternately processing input optical data bits according to odd valued clock signals and even valued clock signals;

wherein each of said at least two parallel detection subcircuits determine output logic values for respective ones of said plurality of sequentially provided electrical representations of optical data bits;

at least two signal analyzers for comparing received electrical representations of optical data bits to a high voltage threshold and a low voltage threshold, respectively;

at least one respective memory device for each of said at least two signal analyzers for respectively storing results of said comparison;

a selective multiplexer for receiving the stored results of each of said memory devices; and a feedback circuit for providing a control signal to a selective multiplexer in a complimentary parallel detection subcircuit.

2. The apparatus of claim 1, wherein said apparatus comprises a first parallel detection subcircuit and a second parallel detection subcircuit operating with timing pulses 180° out of phase from each other.

3. The apparatus of claim 2, wherein said first and second parallel detection subcircuits determine logic values for alternate ones of said plurality of sequentially provided electrical representations of optical data bits.

4. The apparatus of claim 2, wherein if a received electrical representation of an optical data bit is an odd clocked valued bit, the bit is processed by said first parallel detection subcircuit, and if a received electrical representation of an optical data bit is an even clocked valued bit, the bit is processed by said second parallel detection subcircuit.

5. The apparatus of claim 1, wherein the feedback circuit in a first of said at least two parallel detection subcircuits couples a portion of the output of the selective multiplexer in the first parallel detection subcircuit as a control signal for the selective multiplexer in a second of said at least two parallel detection subcircuits and the feedback circuit in the second parallel detection subcircuit couples a portion of the output of the selective multiplexer in the second parallel detection subcircuit as a control signal for the selective multiplexer in the first parallel detection subcircuit.

6. The apparatus of claim 1, wherein said at least two parallel detection subcircuits each further comprise:

at least one secondary memory device for storing an output of said selective multiplexer.

7. The apparatus of claim 6, wherein the feedback circuit in a first of said at least two parallel detection subcircuits couples a portion of the output of the secondary memory device in the first parallel detection subcircuit as a control signal for the selective multiplexer in a second of said at least two parallel detection subcircuits and the feedback circuit in the second parallel detection subcircuit couples a portion of the output of the secondary memory device in the second parallel detection subcircuit as a control signal for the selective multiplexer in the first parallel detection subcircuit.

8. The apparatus of claim 1, wherein at least a first of said at least two parallel detection subcircuits comprises at least two respective memory devices for each of said at least two signal analyzers, such that received electrical representations of optical data bits in said first parallel detection subcircuit are resampled with timing pulses 180° out of phase from the memory device of a complimentary parallel detection subcircuit before being communicated to said respective selective multiplexer.

9. The apparatus of claim 8, wherein the feedback circuit in the first of said at least two parallel detection subcircuits couples a portion of the output of the selective multiplexer in the first parallel detection subcircuit as a control signal for the selective multiplexer in a second of said at least two parallel detection subcircuits and the feedback circuit in the second parallel detection subcircuit couples a portion of the output of the secondary memory device in the second parallel detection subcircuit as a control signal for the selective multiplexer in the first parallel detection subcircuit.

10. A method for data recovery of a plurality of sequentially provided electrical representations of optical data bits, comprising:

in each of a plurality of parallel detection subcircuits, comparing a received electrical representation of an optical data bit to a high voltage threshold and a low voltage threshold to determine a logic value for said received electrical representation of an optical data bit, said parallel detection subcircuits alternately processing input optical data bits according to odd valued clock signals and even valued clock signals;

wherein each of said sequentially provided electrical representations of optical data bits are processed by respective ones of said plurality of parallel detection subcircuits; and wherein said plurality of parallel detection subcircuits include a first, a second and a third parallel detection subcircuit and said first, second and third parallel detection subcircuits are operated 120° out of phase from each other.

11. The method of claim 10, further comprising operating each of said plurality of parallel detection subcircuits with timing pulses out of phase from each other.

12. The method of claim 10, wherein said plurality of parallel detection subcircuits include a first and a second parallel detection subcircuit and said first and second parallel detection subcircuits are operated 180° out of phase from each other.

13. The method of claim 12, wherein odd clocked valued ones of said received electrical representations of optical data bits are processed by said first parallel detection subcircuit, and even clocked valued ones of said received electrical representations of optical data bits are processed by said second parallel detection subcircuit.

14. The method of claim 10, wherein every second clocked valued ones of said received electrical representation of said optical data bits is processed by said second parallel detection subcircuit, and every third clocked valued ones of said received electrical representations of optical data bits is processed by said third parallel detection subcircuit.

15. The method of claim 10, further comprising, feeding back a portion of the output of each of said plurality of parallel detection subcircuits as a control signal to a complimentary parallel detection subcircuit.

16. The method of claim 10, further comprising, feeding back a portion of the output of each of said plurality of parallel detection subcircuits as a control signal to a subsequent parallel detection subcircuit.

* * * * *